UNITED STATES PATENT OFFICE.

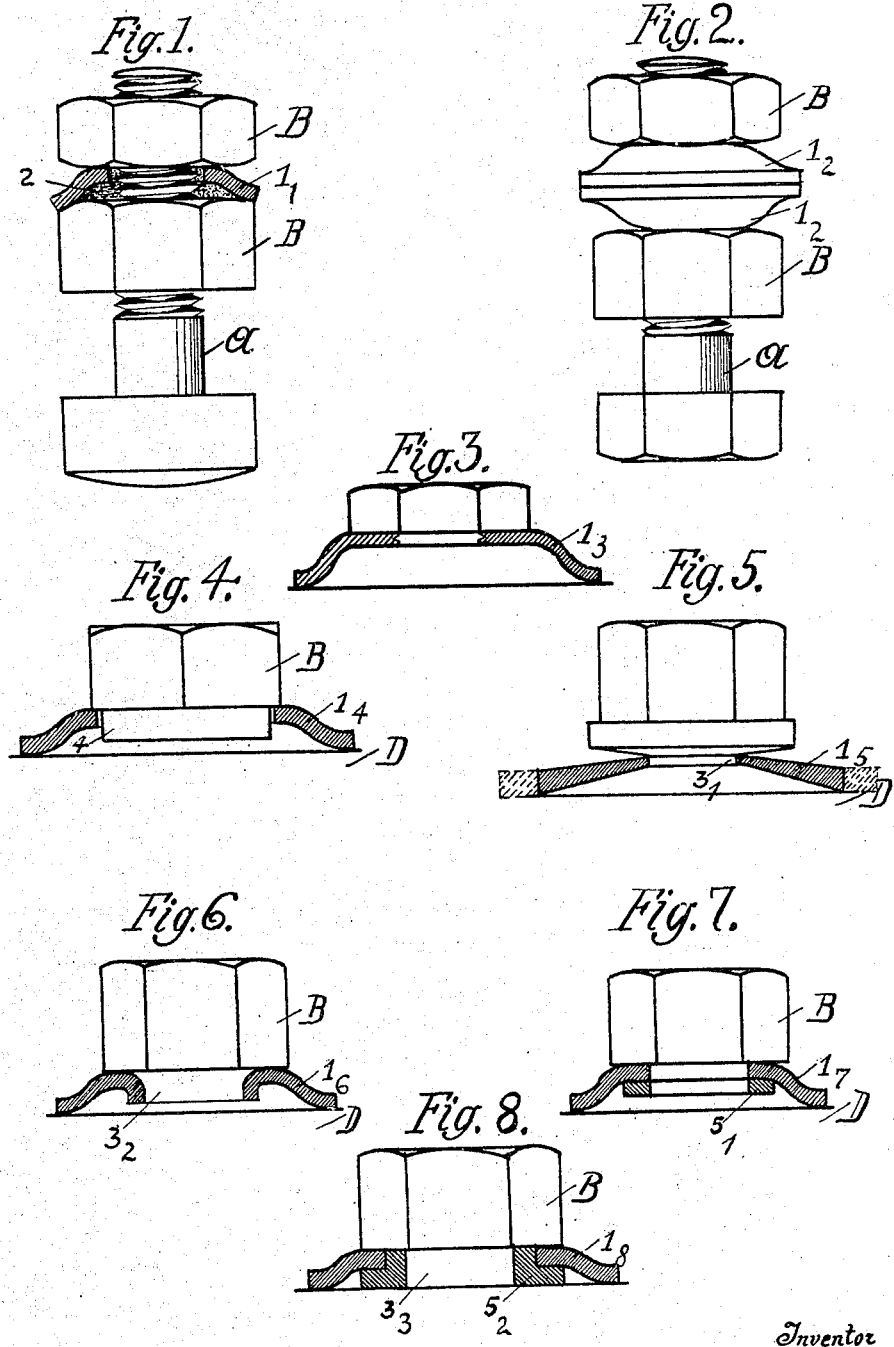

FRANZ MÄRTENS, OF ELBERFELD, GERMANY.

NUT-LOCK.

1,320,259.  Specification of Letters Patent.  Patented Oct. 28, 1919.

Application filed June 16, 1919. Serial No. 304,673.

*To all whom it may concern:*

Be it known that I, FRANZ MÄRTENS, a citizen of the German Republic, and residing at Elberfeld, Germany, have invented certain Improvements in Nut-Locks, of which the following is a specification.

This invention relates to nut-locks and its object is to provide a device of pressure in the screw-thread by pressing a washer of especial form between two nuts or one nut and a bearing.

Another object is to provide a form of the washer designed to be filled up by consistent fat, that will be pressed into the thread by screwing the nuts. In order to avoid too strong strains of the washers they are provided with projections.

The preferred forms of the invention have been shown in the accompanying drawings.

In said drawings:

Figure 1 is a section through a locking-washer and a side-view of the nuts arranged upon a bolt, showing the washer $1_1$ clamped between the nuts and filled up by consistent fat, 2.

Fig. 2 is a view similar to Fig. 1, showing two washers, $1_2$.

Fig. 3 shows a washer $1_3$ with a central opening, the wall of which is screw-threaded so as to engage the thread of the bolt and serving as a nut.

Fig. 4 is a view similar to Fig. 1, showing the same form of the washer engaged between a nut B and a bearing D, said nut having a reduced portion 4 pushing against the bearing and avoiding a further deflection of the washer.

Fig. 5 is a view similar to Fig. 1 with a washer $1_5$ tapered to the middle in order to permit a stronger elastic force and a lesser strain of the outer part of the washer and a nut with conic pressure-surface.

Fig. 6 is a view similar to Fig. 1 with a washer $1_6$ bent to the middle, $3_2$. Fig. 7 is a view similar to Fig. 1 with a washer $1_2$ provided with a disk $5_1$ and Fig. 8 is a view similar to Fig. 1 furnished with a disk $5_2$ with a joining-piece.

Referring to the figures as a matter of reference "A" designates a bolt on which are threaded nuts "B" and "C", pressing against a bearing "D".

In the excavations of the disks or washers consistent fat 2, can be introduced.

All washers are provided with a central opening, through which the bolt or the nut, as is shown in Figs. 1 and 4, is guided. The washers are engaged by pressing the counter-nut against the nut or the nut against the bearing.

Of course various changes may be made in the size and proportions of the lock without departing from the spirit, or sacrificing the advantages of the invention.

What I claim as new is:—

1. A nut lock comprising a nut, an elastic cupped washer having an opening therethrough and adapted to fit about a bolt, and means adapted to engage about the bolt in the opening of the washer and forming with the nut a shoulder against which the washer is adapted to bind.

2. A nut lock comprising an elastic cupped washer having an opening therethrough and adapted to fit about a bolt, said washer adapted to be pressed by a nut threaded on the bolt for frictionally holding the nut against the threads on the bolt, and a disk within the cupped portion of the washer having a central opening for the passage of the bolt and provided with a flange fitting within the opening in the washer.

In testimony that I claim the foregoing as my invention I have signed my name in presence of two subscribing witnesses.

FRANZ MÄRTENS.

Witnesses:
 EMIL BLOCH,
 ELSE PUNZEL.